(12) United States Patent
Canela

(10) Patent No.: US 9,975,523 B1
(45) Date of Patent: May 22, 2018

(54) EMERGENCY WINDSHIELD WIPER SYSTEM

(71) Applicant: Jacqueline De La Concepcion Canela, Miami, FL (US)

(72) Inventor: Jacqueline De La Concepcion Canela, Miami, FL (US)

(*) Notice: Subject to any disclaimer, the term of this patent is extended or adjusted under 35 U.S.C. 154(b) by 0 days. days.

(21) Appl. No.: 15/809,113

(22) Filed: Nov. 10, 2017

(51) Int. Cl.
| | |
|---|---|
| *B60S 1/06* | (2006.01) |
| *B60S 1/08* | (2006.01) |
| *B60S 1/04* | (2006.01) |
| *B60S 1/18* | (2006.01) |
| B60S 1/24 | (2006.01) |

(52) U.S. Cl.
CPC .......... *B60S 1/0497* (2013.01); *B60S 1/0433* (2013.01); *B60S 1/0438* (2013.01); *B60S 1/0441* (2013.01); *B60S 1/08* (2013.01); *B60S 1/18* (2013.01); *B60S 1/24* (2013.01)

(58) Field of Classification Search
CPC .... B60S 1/0433; B60S 1/0438; B60S 1/0497; B60S 1/0441; B60S 1/06; B60S 1/08; B60S 1/24; B60S 1/16; B60S 1/18
USPC ............................. 15/250.001, 250.3, 250.31
See application file for complete search history.

(56) References Cited

U.S. PATENT DOCUMENTS

| | | | | |
|---|---|---|---|---|
| 3,978,542 A | * | 9/1976 | Van Eekelen | B60S 1/26 15/250.17 |
| 4,027,354 A | * | 6/1977 | Burpee | A42B 3/26 15/250.3 |
| 4,316,303 A | * | 2/1982 | Penn | B60S 1/08 15/250.3 |
| 6,324,719 B1 | * | 12/2001 | Ritacco | B60S 1/0497 15/250.3 |
| 7,424,765 B1 | * | 9/2008 | Stevens | B60S 1/28 15/250.29 |
| 8,990,999 B1 | * | 3/2015 | Berkel | B60S 1/0422 15/250.3 |

FOREIGN PATENT DOCUMENTS

| | | | |
|---|---|---|---|
| DE | 2913635 | * | 7/1980 |
| FR | 1295601 | * | 5/1962 |
| GB | 2188536 | * | 10/1987 |

* cited by examiner

*Primary Examiner* — Gary Graham
(74) *Attorney, Agent, or Firm* — Ruben Alcoba, Esq.

(57) ABSTRACT

An emergency windshield wiper system that attaches to the windshield of a vehicle. The system comprises of a platform that is used to secure a battery, a motor, a control, a pair of suction cups, an oscillating gear and an arm that holds a windshield wiper. The suction cups are positioned at opposite ends of the platform so that a center of gravity is created at a midpoint of the platform. The oscillating gear is positioned at the midpoint of the platform and it connects via a connector gear rod to a motor gear that is attached to the motor. The battery, motor and the control are operatively connected. The oscillating gear attaches to the arm. The windshield wiper inserts within the arm of the windshield wiper system.

7 Claims, 7 Drawing Sheets

EMERGENCY WINDSHIELD WIPER SYSTEM

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The present invention is directed to an emergency windshield wiper system that is used to supplement existing vehicle windshield wiper systems that malfunction.

The inventor of the present invention conceived the invention when her windshield wiper system ceased to work properly during her mandatory evacuation from the Florida Keys during Hurricane Irma.

During the evacuation, the wipers of her vehicle stopped functioning properly and driving became nearly impossible, for the wipers were not able to wipe off the precipitation off her vehicle windshield.

The necessity caused her to conceive a temporary windshield wiper system that could be attached to a vehicle during severe weather conditions.

For the foregoing reasons, there is a need for an emergency windshield wiper system that can be secured on a vehicle windshield when the vehicles' existing windshield wipers fail to work properly.

SUMMARY

The present invention is an emergency windshield wiper system that is used when an existing vehicle windshield wiper fails to work properly.

The present invention is an emergency windshield wiper system that comprises of a platform that is used to secure a battery, a motor, a control, a pair of suction cups, an oscillating gear and an arm that holds a windshield wiper. The suction cups are positioned at opposite ends of the platform so that a center of gravity is created at a midpoint of the platform. The oscillating gear is positioned at the midpoint of the platform and it connects via a connector gear rod to a motor gear that is attached to the motor. The battery, motor and the control are operatively connected. The oscillating gear attaches to the arm and the arm defines a channel and a plurality of protruding knobs. The windshield wiper consists of a wiper section and an arm wiper section that defines a series of through holes. The arm wiper section and the wiper section are fabricated to have a certain resistance from each other so that when the wiper arm section is inserted and secured to the arm a resistance is created when the emergency windshield wiper is secured on a vehicle window.

An embodiment of the present invention uses a rechargeable battery and it can be charged using a battery car charger.

Some embodiments of the present invention shall have a top housing to cover the top of the platform and a bottom housing to cover the bottom of the platform.

An object of the present invention is to provide an emergency windshield wiper system that can be used on a vehicle when the existing windshield wiper of the vehicle malfunctions.

DRAWINGS

These and other features, aspects, and advantages of the present invention will become better understood with regards to the following description, appended claims, and drawings where:

DESCRIPTION

Figure 1:
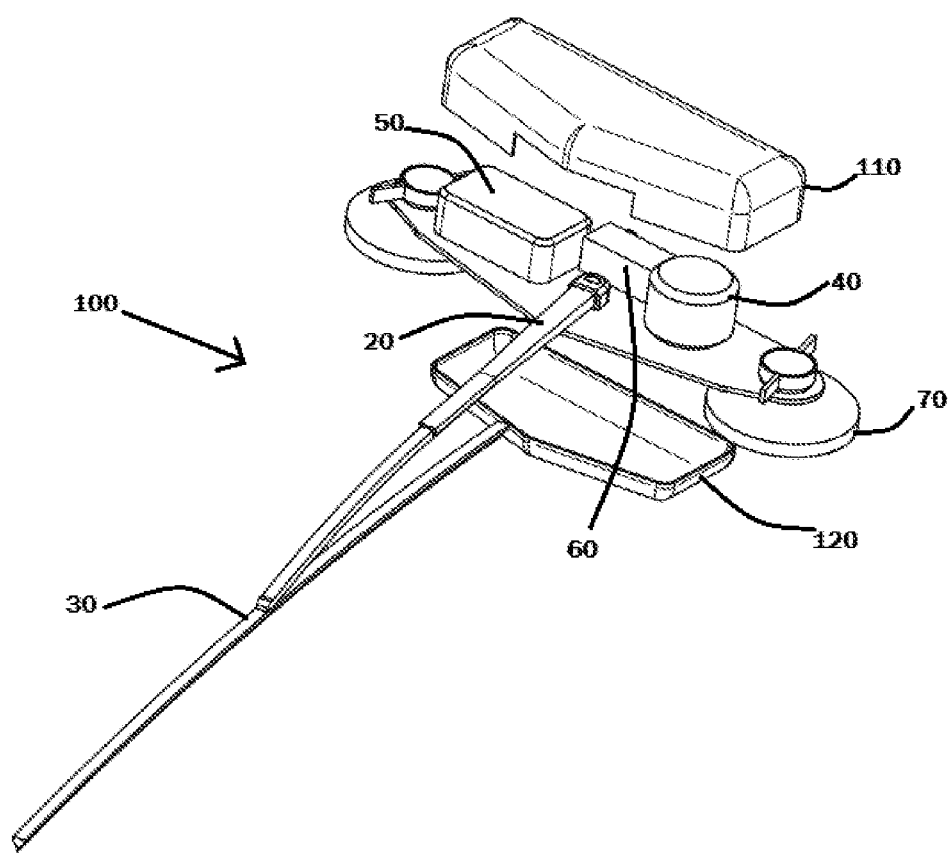
FIG. 1 shows a perspective view of an emergency windshield wiper system.
Figure 2:
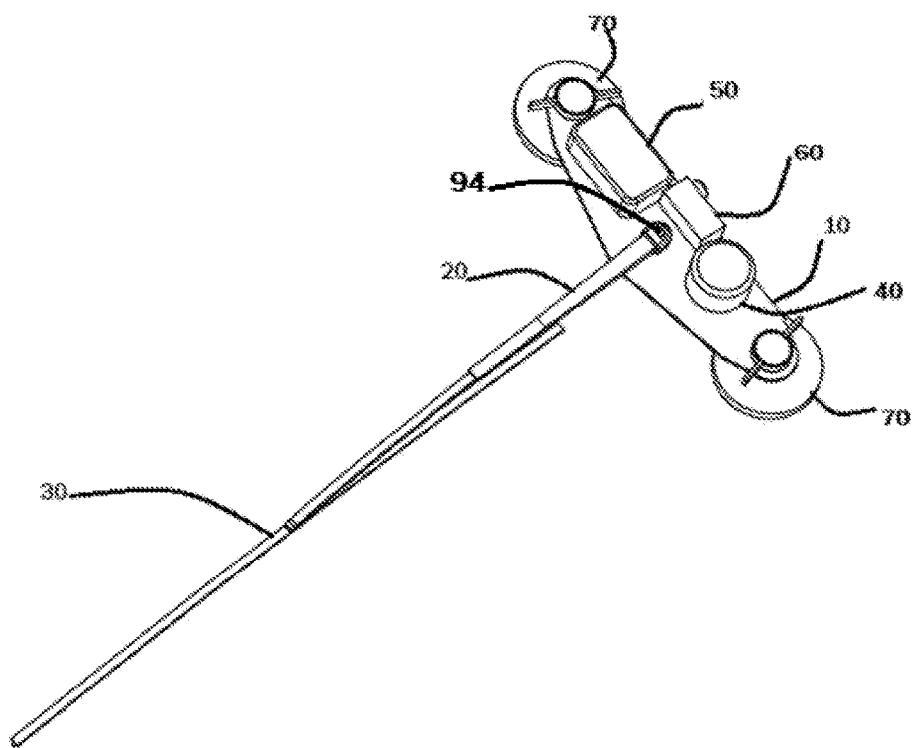
FIG. 2 shows a top perspective view of the emergency windshield wiper system.
Figure 3:
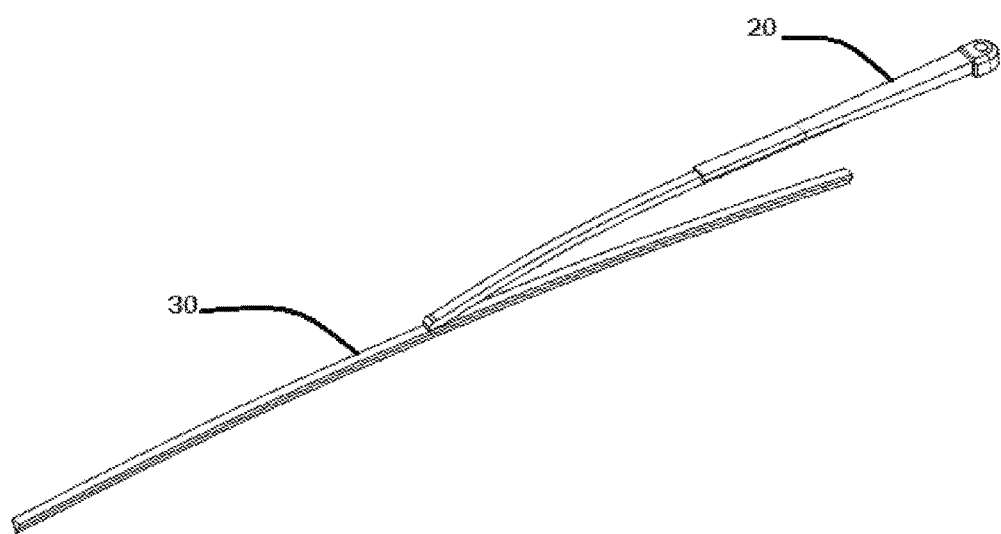
FIG. 3 shows a perspective view of a windshield wiper and arm of the present invention.
Figure 4:
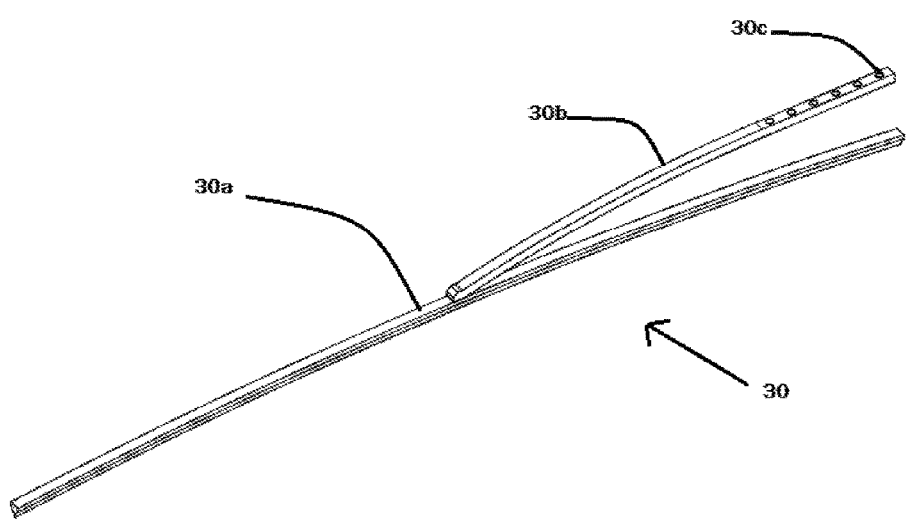
FIG. 4 shows a perspective view of the windshield wiper showing through holes of the windshield wiper.
Figure 5:
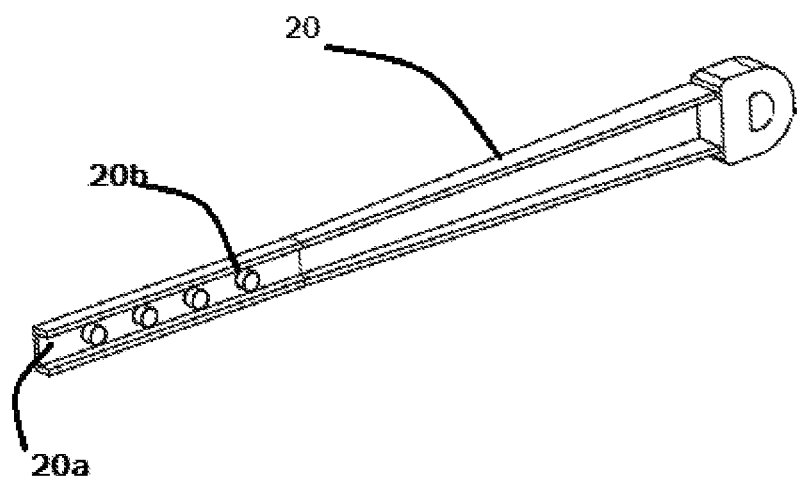
FIG. 5 shows a perspective view of the arm of the present invention wherein the view shows a channel and a plurality of knobs of the arm.
Figure 6:
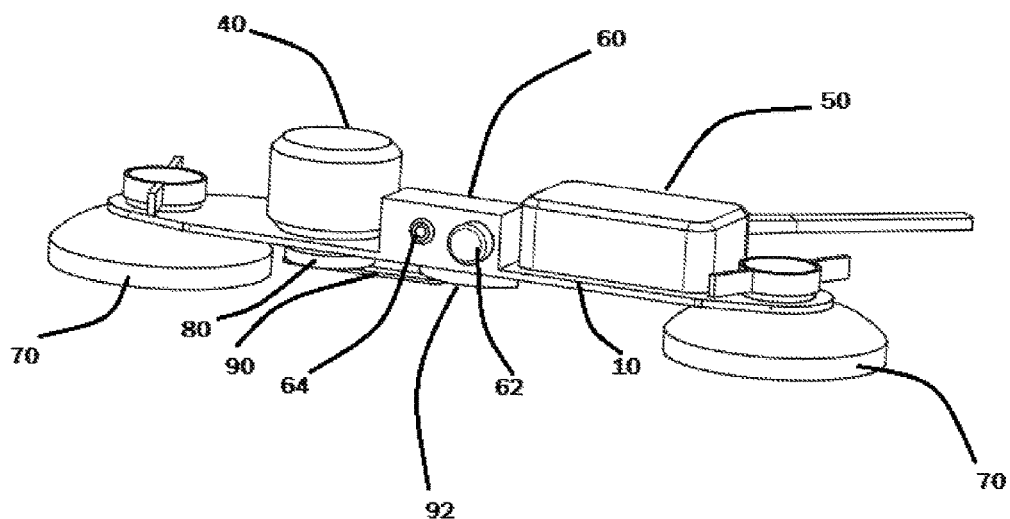
FIG. 6 shows a perspective view of the platform of the present invention and the manner that the elements of the invention are secured to the platform.
Figure 7:
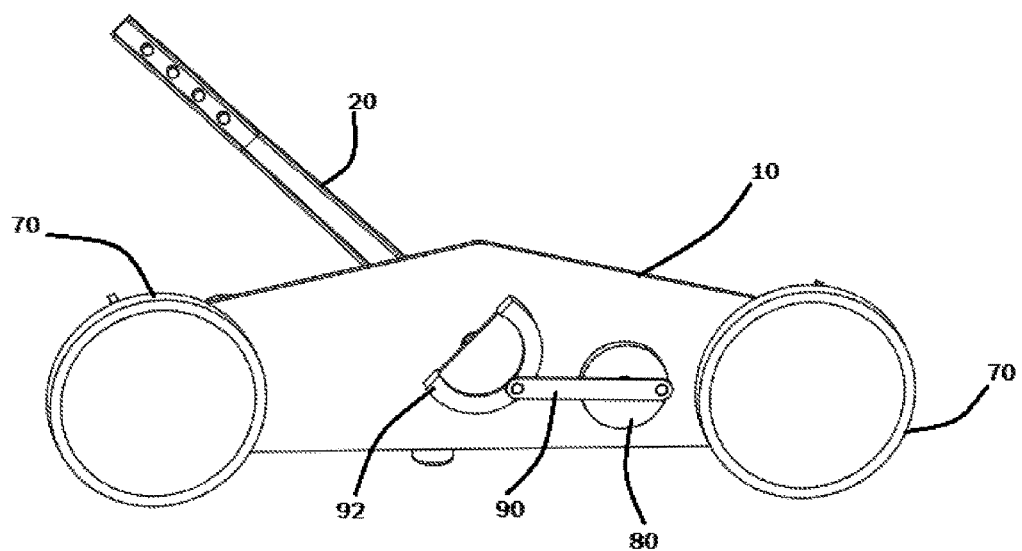
FIG. 7 shows a bottom plat view of the present invention wherein the gears of the invention and their manner of connection are shown.

The present invention, referenced in FIGS. 1-7, is directed to an emergency windshield wiper system 100. The emergency windshield wiper system 100 comprises of a platform 10 that has a top and a bottom that is used to secure a battery 50, a motor 40, a control 60, a pair of suction cups 70, an oscillating gear 80 and an arm 20 that holds a windshield wiper 30. The suction cups 70 are positioned at opposite ends of the platform 10 so that a center of gravity is created at a midpoint of the platform 10. The oscillating gear 92 is positioned at the midpoint of the platform 10 and it connects via a connector gear rod 90 to a motor gear 80 that is attached to the motor 40. The battery 50, motor 40 and the control 60 are operatively connected. The oscillating gear 92 defines an axel 94 that extends outward from the top of the platform 10. The oscillating gear axel 94 attaches to the arm 20 and the arm defines a channel 20*a* and a plurality of protruding knobs 20*b*. The windshield wiper 30 consists of a wiper section 30*a* and an arm wiper section 30*b* that defines a series of through holes 30*c*. The arm wiper section 30*b* and the wiper section 30*a* are fabricated to have a certain resistance from each other so that when the arm wiper section 30*b* is inserted and secured to the arm 20 a resistance is created when the emergency windshield wiper system 100 is secured on a vehicle window.

An embodiment of the present invention uses a rechargeable battery 50 and it can be charged using a battery car charger (not shown in the figures). The rechargeable battery can be a nickel or lithium rechargeable battery.

In another embodiment of the present invention, the emergency windshield wiper system 100 shall have a top housing to cover 110 the top of the platform 10 and a bottom housing 120 to cover the bottom of the platform.

In a further embodiment of the present invention the control 60 comprises of an off and on switch 62 and a recharging plug 64.

In a still further embodiment, the emergency windshield wiper system comprises of a battery car charger (not shown in figures) that connects to the recharging plug 64.

The suction cups of the present invention are either industrial suction cups or vacuum suction cups.

An advantage of the present invention is that it provides an emergency windshield wiper system that is used on a vehicle when the existing windshield wiper of the vehicle malfunctions.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. An emergency windshield wiper system, the emergency windshield wiper system comprises:
   a platform that has a top and a bottom;
   a pair of suction cups that are positioned at opposite ends of the platform so that a center of gravity is created at a midpoint of the platform;
   a battery that is placed on the top of the platform;
   a control that is placed on the top of the platform;
   a motor that is placed on the top of the platform, the battery, the control and the motor are operatively connected;
   an oscillating gear that is positioned at the midpoint of the platform that extends outward from the bottom of the platform, the oscillating gear defines an axel that extends outward from the top of the platform;
   a motor gear that is attached to the motor, the motor gear extends outward from the bottom of the platform and the motor gear and the oscillating gear are connected to each other via a connector gear rod;
   an arm attaches to the axel of the oscillating gear, the arm defines a channel and a plurality of protruding knobs; and
   a windshield wiper that consists of a wiper section and an arm wiper section that defines a series of through holes, the arm wiper section inserts within the arm section and is secured via the knobs of the arm to the arm.

2. The emergency windshield wiper system of claim 1, wherein the battery is a rechargeable battery.

3. The emergency windshield wiper system of claim 2, wherein the rechargeable battery is a lithium battery.

4. The emergency windshield wiper system of claim 3, wherein the suction cups are a pair of vacuum suction cups.

5. The emergency windshield wiper system of claim 4, further comprising:
   a top housing to cover the top of the platform; and
   a bottom housing to cover the bottom of the platform.

6. The emergency windshield wiper system of claim 5, wherein the control comprises an off and on switch and a recharging plug.

7. The emergency windshield wiper system of claim 6, further comprising a battery car charger that connects to the recharging plug.

\* \* \* \* \*